(12) United States Patent
Kim

(10) Patent No.: US 12,312,023 B2
(45) Date of Patent: May 27, 2025

(54) STEERING APPARATUS AND METHOD

(71) Applicant: HL MANDO CORPORATION, Gyeonggi-do (KR)

(72) Inventor: Tae Sik Kim, Gyeonggi-do (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 793 days.

(21) Appl. No.: 17/528,284

(22) Filed: Nov. 17, 2021

(65) Prior Publication Data
US 2022/0153339 A1 May 19, 2022

(30) Foreign Application Priority Data
Nov. 18, 2020 (KR) .................. 10-2020-0154673

(51) Int. Cl.
| | | |
|---|---|---|
| *B62D 5/04* | (2006.01) | |
| *B62D 5/00* | (2006.01) | |
| *B62D 6/00* | (2006.01) | |
| *B62D 6/10* | (2006.01) | |
| *H02P 21/18* | (2016.01) | |
| *H02P 21/22* | (2016.01) | |

(52) U.S. Cl.
CPC .......... *B62D 5/0463* (2013.01); *B62D 5/006* (2013.01); *B62D 5/046* (2013.01); *B62D 6/008* (2013.01); *B62D 6/10* (2013.01); *H02P 21/18* (2016.02); *H02P 21/22* (2016.02)

(58) Field of Classification Search
CPC ........ B62D 5/0463; B62D 6/10; B62D 5/006; B62D 15/0215; B62D 5/046; B62D 15/021; B62D 6/008; H02P 21/18; H02P 21/22
See application file for complete search history.

(56) References Cited

U.S. PATENT DOCUMENTS

| | | | | |
|---|---|---|---|---|
| 5,796,248 A | * | 8/1998 | Weber | F02D 11/10 |
| | | | | 324/207.16 |
| 5,896,942 A | * | 4/1999 | Bohner | B62D 5/005 |
| | | | | 180/444 |
| 5,931,256 A | * | 8/1999 | Langkamp | B62D 6/008 |
| | | | | 180/405 |
| 6,847,177 B1 | * | 1/2005 | Gluch | H02K 29/06 |
| | | | | 318/567 |
| 7,034,483 B2 | * | 4/2006 | Takahashi | B62D 6/008 |
| | | | | 318/434 |
| 7,130,728 B2 | * | 10/2006 | Suzuki | B62D 6/008 |
| | | | | 180/413 |
| 7,595,577 B2 | * | 9/2009 | Niguchi | H02K 29/03 |
| | | | | 310/156.01 |
| 7,694,777 B2 | * | 4/2010 | Yamashita | B62D 5/0484 |
| | | | | 180/443 |

(Continued)

*Primary Examiner* — Timothy Wilhelm
(74) *Attorney, Agent, or Firm* — WOMBLE BOND DICKINSON (US) LLP

(57) ABSTRACT

The present disclosure relates to steering apparatuses and methods. The steering apparatus includes a counter-force-generating motor that includes a rotor and a stator disposed to face the rotor, and is capable of supplying a counter force to a steering wheel, an angle sensor for sensing a relative angle between the rotor and the stator, and an electronic control unit capable of dynamically controlling a flow of a current applied to the stator based on the relative angle sensed by the angle sensor. The steering method is provided for steering a steering wheel using the steering apparatus.

14 Claims, 10 Drawing Sheets

(56) References Cited

U.S. PATENT DOCUMENTS

| | | | |
|---|---|---|---|
| 9,366,523 B2 * | 6/2016 | Klimenko | F24S 20/69 |
| 9,623,900 B2 * | 4/2017 | Yukitake | B62D 5/003 |
| 10,940,882 B2 * | 3/2021 | Kim | B62D 5/006 |
| 10,953,912 B2 * | 3/2021 | Rawlings | F16H 57/039 |
| 11,075,599 B2 * | 7/2021 | Shiino | B62D 5/0463 |
| 11,167,793 B2 * | 11/2021 | Hong | B62D 5/0469 |
| 11,897,553 B2 * | 2/2024 | Shin | B62D 15/021 |
| 12,030,559 B2 * | 7/2024 | Kakimoto | B62D 15/021 |
| 2006/0169519 A1 * | 8/2006 | Osonoi | B62D 1/163 |
| | | | 180/402 |
| 2007/0107974 A1 * | 5/2007 | Ueno | H02K 21/14 |
| | | | 180/444 |
| 2007/0168093 A1 * | 7/2007 | Nishiyama | B62D 5/0466 |
| | | | 701/41 |
| 2010/0168964 A1 * | 7/2010 | Higashi | B62D 5/008 |
| | | | 701/42 |
| 2013/0138300 A1 * | 5/2013 | Hayama | B62D 5/046 |
| | | | 701/43 |
| 2014/0343697 A1 * | 11/2014 | Kuipers | B60W 50/16 |
| | | | 700/83 |
| 2021/0070361 A1 * | 3/2021 | Erickson | H02P 6/08 |
| 2022/0185364 A1 * | 6/2022 | Kwon | B62D 5/006 |
| 2023/0014650 A1 * | 1/2023 | Kim | B62D 5/006 |

* cited by examiner

STEERING APPARATUS AND METHOD

CROSS-REFERENCE TO RELATED APPLICATION

This application claims the priority benefit of Republic of Korea Patent Application No. 10-2020-0154673, filed on Nov. 18, 2020 in the Korean Intellectual Property Office, the disclosure of which is incorporated herein by reference in its entirety.

BACKGROUND

Field of the Disclosure

The present disclosure relates to steering apparatuses and methods.

Description of the Background

In general, power steering systems have been developed and applied as vehicle steering apparatuses to provide convenience in driving by assisting the turning of a steering wheel by a driver. The power steering systems are generally classified into a hydraulic type of power steering apparatus using hydraulic pressure, an electro-hydraulic type of power steering apparatus using both hydraulic pressure and electric power of a motor, and an electric type of power steering apparatus using only the electric power of the motor.

Recently, a steer-by-wire (SBW) type of steering apparatus has been developed and applied that does not include mechanical connection devices such as a steering column, a universal joint, a pinion shaft, and the like between a steering wheel and vehicle wheels.

However, in the case of the steer-by-wire (SBW) type of steering apparatus, as such a mechanical connection between the steering shaft and vehicle wheels is not included, there is a probability of allowing drivers to turn the steering wheel continually beyond a certain limitation. Thus, the steer-by-wire type of steering apparatus has a disadvantage of reducing steering feel of drivers.

To address this issue, the steer-by-wire type of steering apparatus includes a steering motor capable of generating a counter steering force for preventing the steering feel of drivers from being reduced, and a speed reducer (a belt and pulley assembly, a worm and worm wheel assembly, and the like) for transferring the generated counter force to a steering shaft connected to the steering wheel. However, the speed reducer having a long column structure has disadvantages that generally causes packaging to be difficult, and causes the structure of the steering apparatus to become complicate due to an arrangement for preventing interference with adjacent components.

SUMMARY

To address these issues, embodiments of the present disclosure provide steering apparatuses and methods for generating a counter force and transferring the generated counter force to a steering shaft without including a speed reducer.

According to one aspect of the present disclosure, a steering apparatus is provided that includes a counter-force-generating motor that includes a rotor and a stator disposed to face the rotor, and is capable of supplying a counter force to a steering wheel, an angle sensor for sensing a relative angle between the rotor and the stator, and an electronic control unit capable of dynamically controlling a direction of a current applied to the stator based on the relative angle sensed by the angle sensor.

According to another aspect of the present disclosure, a steering method is provided that includes an angle sensing step of detecting a relative angle between a rotor and a stator disposed to face the rotor that are included in a counter-force-generating motor capable of supplying a counter force to a steering wheel, and a current control step of dynamically controlling a direction of a current applied to the stator based on the relative angle.

According to embodiments of the present disclosure, as a counter force is generated and transferred to a steering shaft without including a speed reducer, it is possible to provide a steering apparatus and a steering method capable of providing an advantage in packaging and simplifying the structure of the steering apparatus.

BRIEF DESCRIPTION OF THE DRAWINGS

The accompanying drawings, which are included to provide a further understanding of the disclosure and are incorporated in and constitute a part of the disclosure, illustrate aspects of the disclosure and together with the description serve to explain the principle of the disclosure. In the drawings.

DETAILED DESCRIPTION

Figure 1:
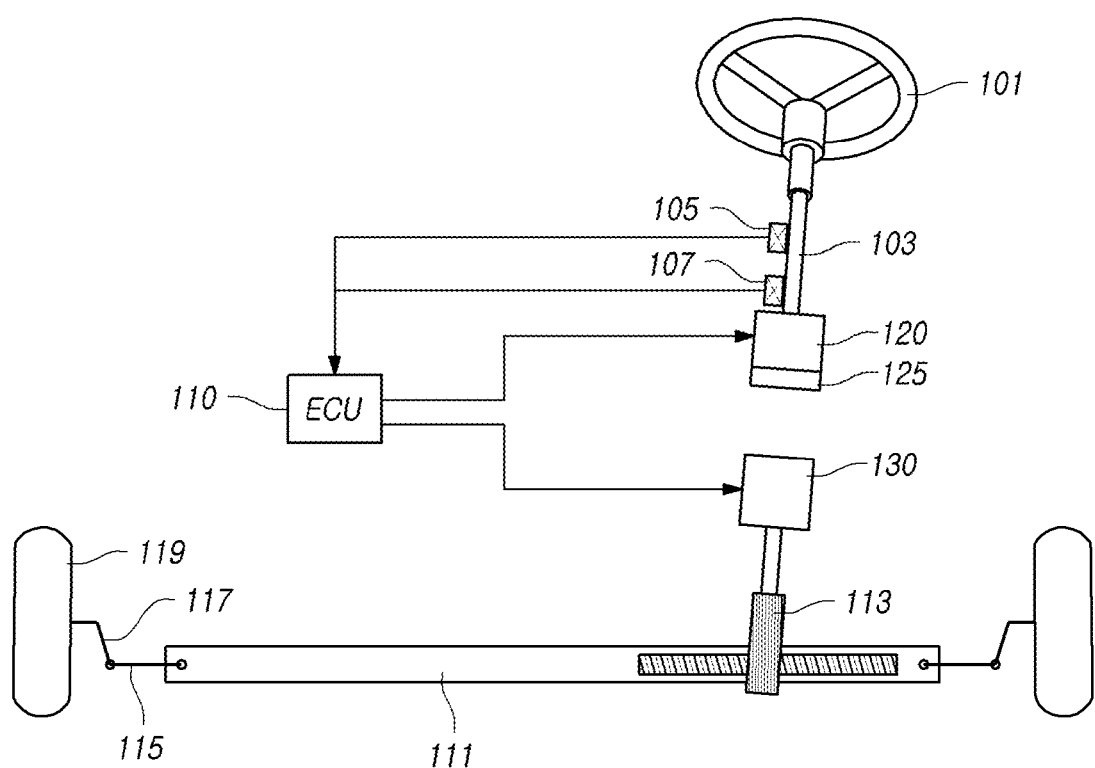
FIG. 1 schematically illustrates a steer-by-wire type of steering apparatus according to aspects of the present disclosure.

In the following description of examples or embodiments of the present disclosure, reference will be made to the accompanying drawings in which it is shown by way of illustration specific examples or embodiments that can be implemented, and in which the same reference numerals and signs can be used to designate the same or like components even when they are shown in different accompanying drawings from one another. Further, in the following description of examples or embodiments of the present disclosure, detailed descriptions of well-known functions and components incorporated herein will be omitted when it is determined that the description may make the subject matter in some embodiments of the present disclosure rather unclear. The terms such as "including", "having", "containing", "constituting" "make up of", and "formed of" used herein are generally intended to allow other components to be added unless the terms are used with the term "only". As used herein, singular forms are intended to include plural forms unless the context clearly indicates otherwise.

Terms, such as "first", "second", "A", "B", "(A)", or "(B)" may be used herein to describe elements of the disclosure. Each of these terms is not used to define essence, order, sequence, or number of elements etc., but is used merely to distinguish the corresponding element from other elements.

When it is mentioned that a first element "is connected or coupled to", "contacts or overlaps" etc. a second element, it should be interpreted that, not only can the first element "be directly connected or coupled to" or "directly contact or overlap" the second element, but a third element can also be "interposed" between the first and second elements, or the first and second elements can "be connected or coupled to", "contact or overlap", etc. each other via a fourth element. Here, the second element may be included in at least one of two or more elements that "are connected or coupled to", "contact or overlap", etc. each other.

When time relative terms, such as "after," "subsequent to," "next," "before," and the like, are used to describe processes or operations of elements or configurations, or flows or steps in operating, processing, manufacturing methods, these terms may be used to describe non-consecutive or non-sequential processes or operations unless the term "directly" or "immediately" is used together.

In addition, when any dimensions, relative sizes etc. are mentioned, it should be considered that numerical values for an elements or features, or corresponding information (e.g., level, range, etc.) include a tolerance or error range that may be caused by various factors (e.g., process factors, internal or external impact, noise, etc.) even when a relevant description is not specified. Further, the term "may" fully encompasses all the meanings of the term "can".

FIG. 1 schematically illustrates a steer-by-wire type of steering apparatus according to aspects of the present disclosure.

Referring to FIG. 1, the steer-by-wire type of steering apparatus includes a steering angle sensor 105 and a torque sensor 107 that are coupled to a portion of a steering shaft 103 connected with a steering wheel 101 and sense operations of the steering wheel 101 by a driver, and an electronic control unit 110 for controlling a counter-force-generating motor 110 and a pinion-shaft motor 130 based on electric signals received from the steering angle sensor 105 and the torque sensor 107.

As shown in FIG. 1, the steering angle sensor 105 and the torque sensor 107 may be provided separately; however, embodiments of the present disclosure are not limited thereto. For example, the steering angle sensor 105 and the torque sensor 107 may be integrated in a single torque-angle sensor.

The electronic control unit 110 can control the counter-force-generating motor 120 and the pinion-shaft motor 130 based on the electric signals received from the steering angle sensor 105 and the torque sensor 107 and other electric signals received from additional various sensors mounted on a vehicle.

The pinion-shaft motor 130 can slide a rack bar 111 connected with a pinion shaft 113 to enable vehicle wheels 119 to be steered through tie rods 115 and knuckle arms 117, and the counter-force-generating motor 120 can generate a counter steering force when the steering wheel 101 is operated by the driver, or perform the steering of the steering shaft 103 during autonomous driving.

Although FIG. 1 illustrates that the steering angle sensor 105 and the torque sensor 107 are disposed on the steering shaft 103, however, embodiments of the present disclosure are not limited thereto. In some embodiments, for providing steering information to the electronic control unit 110, motor position sensors, radars, cameras, still and/or moving image sensors, and the like may be further employed in the steering apparatus. For convenience of description, discussions related to these components will be omitted.

The counter-force-generating motor 120 may be employed in combination with a stopper 125 for stopping the turning of the steering shaft at a preset angle. That is, in a situation where the rotation of the vehicle wheels 119 reaches a maximum point (in the case of a typical steering apparatus, when the steering wheel 101 or the vehicle wheels 119 are in a full-turned state), as the steering shaft 103 cannot be turned any more due to the stopper 125, it is possible to provide drivers with information that the rotation of the wheels 119 has reached the maximum point.

In general, the counter-force-generating motor 120 may be employed in combination with a speed reducer (not shown) for transferring a generated counter force to the steering shaft 103 connected with the steering wheel 101. However, as the speed reducer has a long column structure, the speed reducer has disadvantages of causing difficult packaging, and causing the structure of the steering apparatus to become complicate due to an arrangement for preventing interference with adjacent components.

To address these issues, embodiments of the present disclosure provide steering apparatuses and methods for generating a counter force and transferring the generated counter force to the steering shaft without such a speed reducer.

Figure 2:
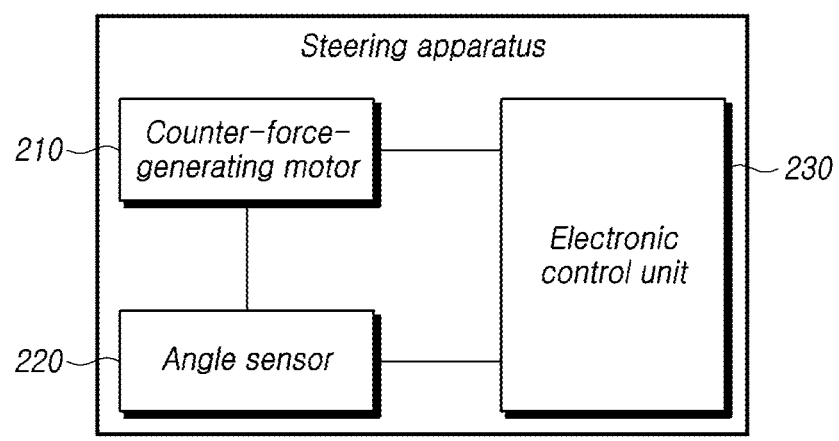
FIG. 2 is a block diagram of the steering apparatus according to aspects of the present disclosure.

FIG. 2 is a block diagram of the steering apparatus according to aspects of the present disclosure.

Referring to FIG. 2, the steering apparatus may include a counter-force-generating motor 120 that includes a rotor and a stator disposed to face the rotor and supplies the steering wheel with a counter force.

The counter-force-generating motor 210 may have a flat rotor type structure in which the rotor and the stator are disposed to face each other; however, embodiments of the present disclosure are not limited thereto. For example, the counter-force-generating motor 210 may have any structure as long as the rotor and the stator are disposed to face each other.

The rotor and the stator of the counter-force-generating motor 210 may be disposed to face each other with a dash panel interposed therebetween. The dash panel may include all, or one or more, of devices and mechanisms for separating an engine room and a driver compartment. Further, the dash panel may contain a non-magnetic material.

The rotor of the counter-force-generating motor 210 may be integrated with the steering shaft connected with the steering wheel, and thus, can rotate in sync with the turning of the steering shaft. In this case, a rotation angle of the rotor can be sensed by a sensor separately disposed in the rotor; however, embodiments of the present disclosure are not limited thereto. For example, the rotation angle of the rotor can be sensed by a steering angle sensor coupled to a portion of the steering shaft.

The rotor of the counter-force-generating motor 210 may contain X number of poles, and the stator thereof may contain Y number of slots. The poles of the rotor may be magnetized to function as permanent magnets; however, embodiments of the present disclosure are not limited thereto. For example, the poles of the rotor may contain any polarizable material. A coil wound in a predetermined direction may be disposed in the slots of the stator.

The steering apparatus may include an angle sensor 220 for sensing a relative angle between the rotor and the stator. A relative angle sensed by the angle sensor 220 may be an angle between any one of the X number of poles of the rotor and any one of the Y number of slots of the stator with respect to a rotation shaft of the counter-force-generating motor 210.

The steering apparatus may include an electronic control unit 230 capable of dynamically controlling a direction in which a current applied to the stator flows based on the relative angle sensed by the angle sensor 220.

The electronic control unit 230 may determine the direction of the current applied to the stator by comparing the relative angle with a central angle determined based on the number of slots of the stator. In one embodiment, when the relative angle is less than the central angle, a current flowing in a first direction may be applied to the stator so that different polarities can be induced in poles of the rotor and slots of the stator. In another embodiment, when the relative angle is greater than the central angle, a current flowing in a second direction may be applied to the stator so that an identical polarity can be induced in poles of the rotor and slots of the stator.

All of the X number of poles contained in the rotor of the counter-force-generating motor 210 may have an identical polarity. In one embodiment, the poles included in the rotor may be configured such that the permanent magnets are disposed perpendicular to the rotor and disposed in parallel with the steering shaft, which is the rotation shaft, so that all poles in a direction toward the stator may have an identical polarity; however, embodiments of the present disclosure are not limited thereto. In another embodiment, all of the poles of the rotor may contain a material representing an identical polarity.

The electronic control unit 230 can dynamically control an amount of current applied to the stator based on an absolute value of a steering angle of the steering wheel. In this case, the amount of current applied to the stator may be proportional to the absolute value of the steering angle of the steering wheel.

In consequence, as a counter force can be generated and transferred to the steering shaft through the steering apparatus according to embodiments described herein without including a speed reducer, it is possible to facilitate packaging with the steering shaft and simplify the structure of the steering apparatus.

Hereinafter, more various embodiments of the steering device described above will be described with reference to figures.

Figure 3:
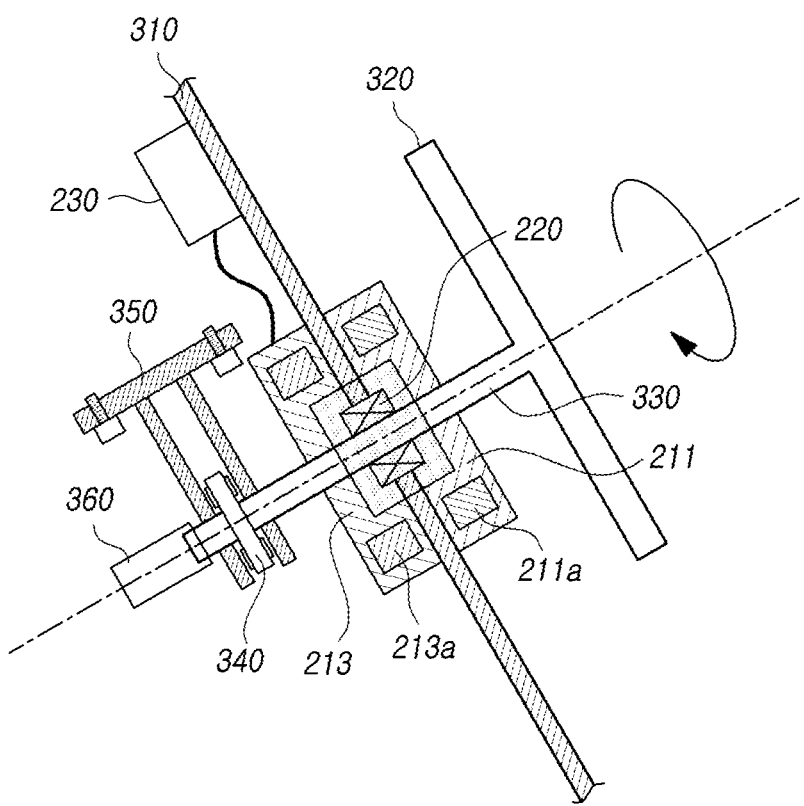
FIG. 3 is a cross-sectional view of the steering apparatus according to aspects of the present disclosure.

FIG. 3 is a cross-sectional view of the steering apparatus according to aspects of the present disclosure.

Referring to FIG. 3, the rotor 211 and the stator 213 of the counter-force-generating motor 210 may be disposed to face each other with the dash panel 310 interposed therebetween. In one embodiment, with respect to the dash panel 310 serving as a boundary, the rotor 211 may be disposed on the driver compartment side, and the stator 213 may be disposed on the engine room side; however, embodiments of the present disclosure are not limited thereto. For example, with respect to the dash panel 310 serving as a boundary, the stator 213 may be disposed on the driver compartment side, and the rotor 213 may be disposed on the engine room side.

The dash panel 310 may contain a non-magnetic material. For example, the dash panel 310 may be formed of plastic; however, embodiments of the present disclosure are not limited thereto. The dash panel 310 may be formed of one or more of non-magnetic materials through which a magnetic field does not flow. Accordingly, the dash panel 310 may not affect attractive force or repulsive force generated between the rotor 211 and the stator 213 of the counter-force-generating 210. As the rotor 211 is spaced apart from the stator 213 by a predetermined distance with respect to the dash panel 310 serving as a boundary, the rotation of the rotor 211 can be facilitated, and when any of the poles of the rotor 211 abnormally operates, for example, failing to have a polarity, the replacement of such a pole can be effectively performed.

The rotor 211 of the counter-force-generating 210 may be integrated with the steering shaft 330 connected to the steering wheel 320, and thus, can rotate in sync with the rotation of the steering shaft 330. However, embodiments of the present disclosure are not limited thereto. For example, the rotor 211 may rotate in sync with the steering shaft 330 by a separate power transmission device based on a steering angle signal or a torque signal related to the rotation of the steering shaft 330.

The angle sensor 220 may be disposed between the rotor 211 and the stator 213 of the counter-force-generating 210, and can sense a relative angle between the rotor 211 and the stator 213. For example, the angle sensor 220 may be coupled to the steering shaft 330, which is the rotation shaft of the rotor 211 and the stator 213, and can sense a relative angle between at least one of the poles 211a of the rotor 211 and at least one of the slots 213a of the stator 213. A plurality of angle sensors 220 may be disposed and can sense respective relative angles between the poles 211a of the rotor 211 and the slots 213a of the stator 213.

The electronic control unit 230 can generate a counter force based on relative angle signals supplied from the angle sensors 220 and supply the stator 213 with a current-flowing direction control signal to be transmitted to the steering shaft. Although not shown in FIG. 3, the electronic control unit 230 can supply the stator 213 with a signal for controlling an amount of current based on a steering angle signal supplied from a steering angle sensor (not shown) coupled to a portion of the steering shaft 330.

A thrust bearing 340 may be coupled to a lower portion of the steering shaft 330, and a location of the thrust bearing 340 may be fixed by a bracket 350. The thrust bearing 340 can support a load in the direction of the steering shaft 330.

A stopper 360 may be disposed in an edge of the steering shaft 330 to which the thrust bearing 340 is coupled. In another embodiment, instead of using the stopper 360, the function of the stopper may be provided by preventing the steering shaft 330 from rotating over a certain limitation through a control based on a counter force generated by the counter-force-generating 210 and transferred to the steering shaft 330.

FIGS. 4 to 8 illustrate examples of controlling a direction in which a current flows in the steering apparatus according to aspects of the present disclosure.

Figure 4:
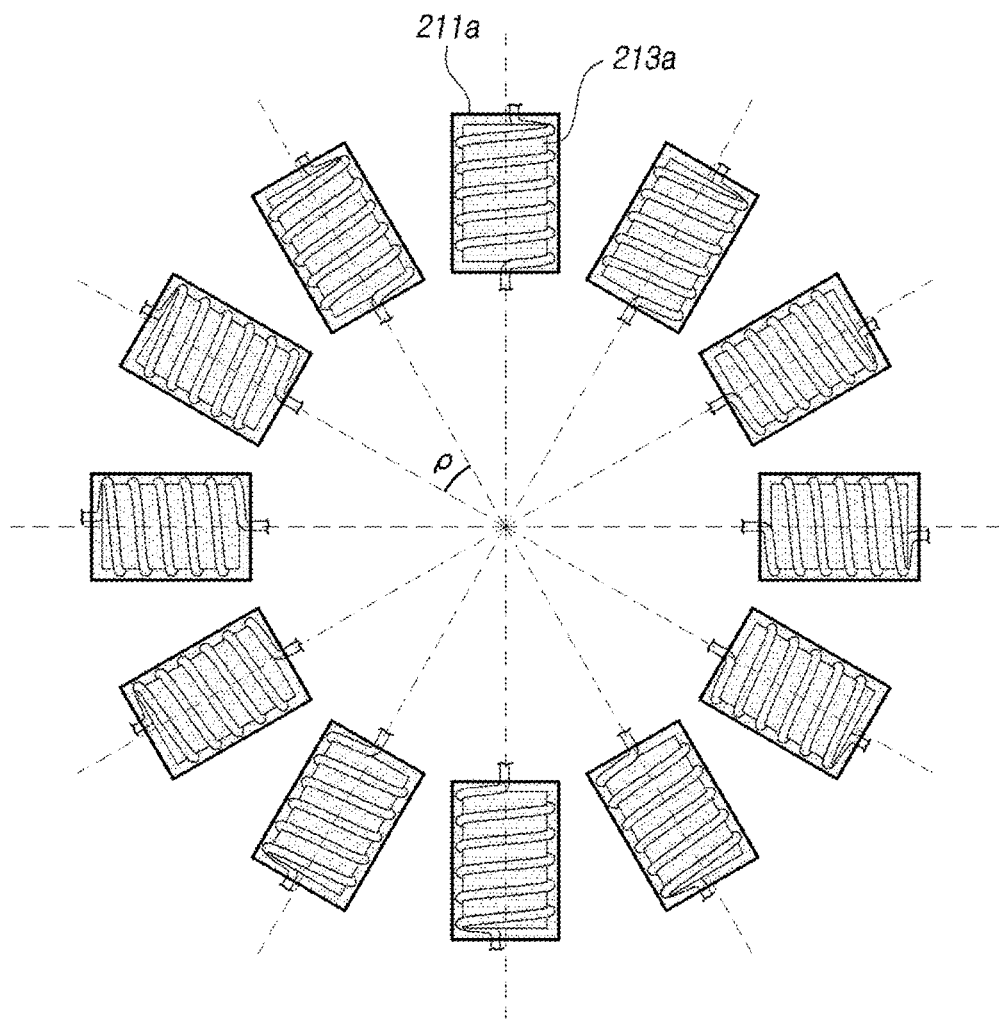
FIGS. 4 to 8 illustrate examples of controlling a direction in which a current flows in the steering apparatus according to aspects of the present disclosure.

FIG. 4 is a diagram illustrating that the steering shaft 330 is in a neutral state.

Referring to FIG. 4, the rotor 211 of the counter-force-generating 210 may contain X number of poles 211a, and the stator 213 may contain Y number of slots 213a. For example, as shown in FIG. 4, the rotor 211 may include 12 poles 211a, and the stator 213 may include 12 slots 213a. However, embodiments of the present disclosure are not limited thereto. In some embodiments, the number of poles X and the number of slots Y may be any natural number, where X and Y may have an identical value or different values. For example, the number of poles 211a of the rotor 211 and the number of slots 213a of the stator 213 may be 6 and 9, 8 and 12, 10 and 12, 12 and 12, 14 and 16, or the like, respectively. Hereinafter, although discussions will be given based on a combination of 12 poles and 12 slots, such discussions may also be applied to other combinations of any number of poles 211a and any number of slots 213a.

An angle ρ between adjacent slots 213a may be determined according to the number of slots 213a. As shown in FIG. 4, in a situation where 12 slots 213a are formed, an angle ρ between adjacent slots may be 30 degrees as an angle obtained by dividing 360 degrees by 12 which is the number of slots 213a.

In a situation where the steering shaft 330 is in the neutral state, a current may not be applied to the stator 213; however, embodiments of the present disclosure are not limited thereto. In this situation, a current may be applied to the slots 213a of the stator 213 so that a polarity different from that of the poles 211a of the rotor 211 can be induced into the slots 213a of the stator 213. For example, when a pole 211a of the rotor 211 disposed in a 12 o'clock position is an N pole, a current for enabling a corresponding slot 213a of the stator 213 to have an S pole having a polarity different from the N pole may be applied to the slot 213a of the stator 213. In this situation, an attractive force can be generated between the slot 213a of the stator 213 and the pole 211a of the rotor 211, thus, leading the steering shaft 330 to remain in the neutral state.

Figure 5:
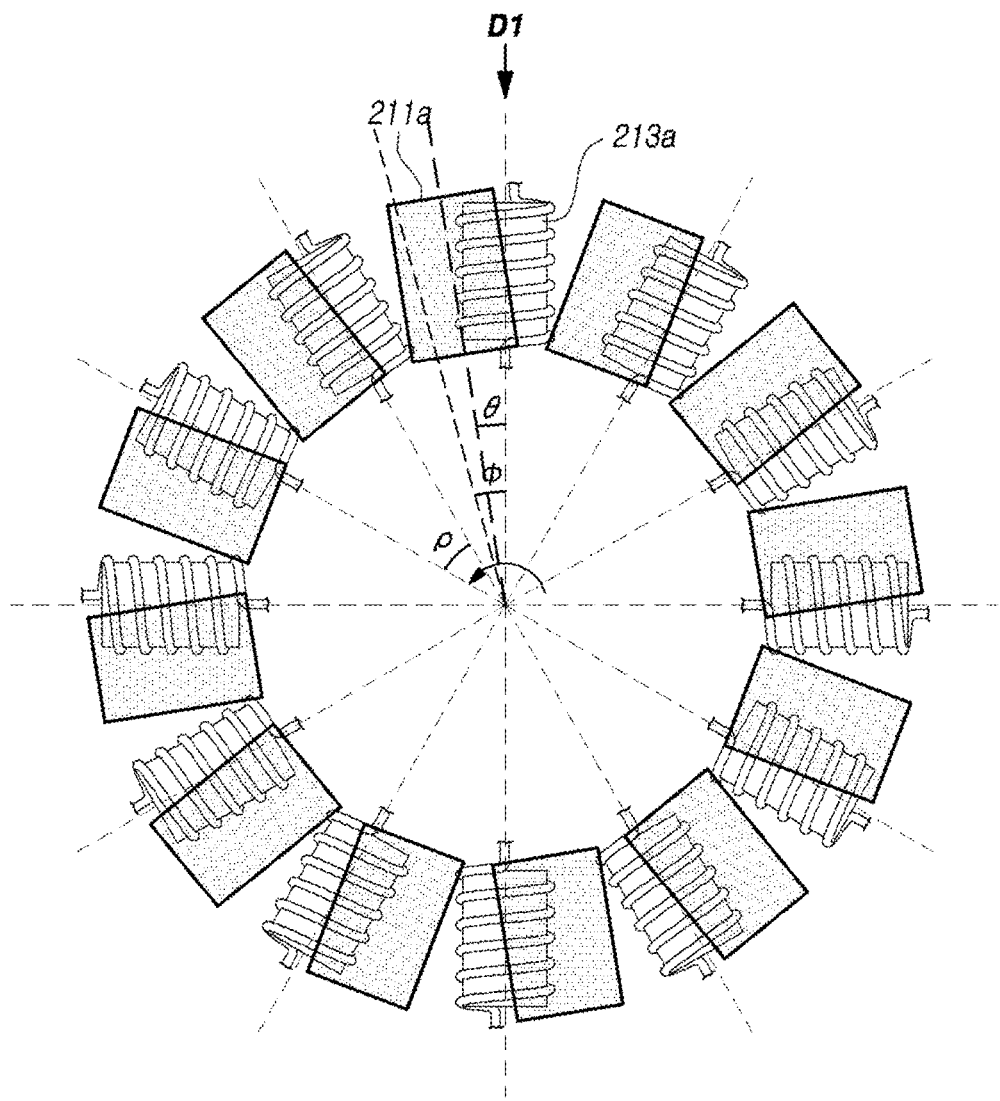

FIG. 5 is a diagram illustrating a situation in which the steering shaft 330 is rotated counterclockwise by 10 degrees.

A relative angle θ sensed by the angle sensor 220 may be an angle between any one of the X number of poles 213a of the rotor 211 and any one of the Y number of slots 213a of the stator 213 with respect to the steering shaft 330, which is the rotation shaft of the counter-force-generating 210. For example, the relative angle θ may be an angle between a pole 211a that rotates and an adjacent slot 213a in a direction opposite to a direction in which this pole 211a rotates with respect to the steering shaft 330, which is the rotation shaft.

For example, referring to FIG. 5, a relative angle θ may be 10 degrees as an angle between a pole 211a rotating in a counterclockwise direction from a 12 o'clock position toward an 11 o'clock position and a slot 213a that is adjacent to this pole 211a in a direction opposite to the rotation direction of the pole 211a and is in the 12 o'clock position with respect to the steering shaft 330, which is the rotation shaft.

The electronic control unit 230 may determine a direction of the current applied to the stator 213 by comparing the relative angle θ with a central angle φ determined based on the number of slots 213a of the stator 213.

The central angle φ may be determined based on the number of slots 213a of the stator 213. For example, when a relative angle θ is an angle between a pole 211a that rotates and a slot 213a adjacent to this pole 211a in a direction opposite to a rotation direction of the pole 211a with respect to the steering shaft 330, which is the rotation axis, a central angle φ may be an angle obtained by dividing an angle ρ between slots 213a adjacent to each other by 2. That is, the central angle φ may be determined based on an angle ρ between adjacent slots determined according to the number of slots 213a of the stator 213.

For example, when a relative angle θ is 10 degrees as an angle between a pole 211a that rotates and a slot 213a adjacent to this pole 211a in a direction opposite to a rotation direction of the pole 211a with respect to the steering shaft 330, which is the rotation axis, a central angle φ may be 15 degrees obtained by dividing 30 degrees, which is an angle ρ between adjacent slots determined according to 12 slots 213a of the stator 213, by 2.

According to the embodiments described above, the relative angle θ may be determined by the pole 211a that rotates and the slot 213a adjacent to this pole 211a in a direction opposite to a rotating direction of the pole 211a; however, embodiments of the present disclosure are not limited thereto. For example, the relative angle θ may be an angle between a pole 211a that rotates and a slot 213a that does not adjacent to this pole 211a in a direction opposite to the rotation direction of the pole 211a with respect to the steering shaft 330, which is the rotation shaft. In this case, a central angle φ may become different.

In one embodiment, a relative angle θ may be 190 degrees as an angle between a pole 211a rotating in a counterclockwise direction from the 12 o'clock position toward the 11 o'clock position and a slot 213a that is not adjacent to this pole 211a in a direction opposite to the rotation direction of the pole 211a and is in the 6 o'clock position with respect to the steering shaft 330. In this case, a central angle φ may be 195 degrees as an angle obtained by adding 180 degrees formed by six slots 312a to 15 degrees obtained by dividing 30 degrees, which is an angle ρ between the slots 213a, by 2.

In this manner, criteria or conditions for determining a relative angle (θ) and a central angle (φ) to be used when the electronic control unit 230 determines a direction of the current applied to the stator 213 may be set in advance, or be set or determined by a setting of a user or a setting of a manufacturer when a vehicle is rolled out or manufactured. Such determination criteria or conditions of the determined or set relative angle θ and central angle φ may be fixed or may be dynamically changed depending on an environment, an input signal from a user, or the like.

Hereinafter, although discussions will be given based on a situation where a relative angle θ and a central angle φ are determined by a pole 211a that rotates and a slot 213a adjacent to this pole 211a in a direction opposite to the rotating direction of the pole 211a, it should be understood that such discussions may be also applied to a situation where the relative angle θ and the central angle φ are determined by the pole 211a that rotates and a slot 213a that is not adjacent to this pole 211a in a direction opposite to the rotating direction of the pole 211a.

When a relative angle θ is less than a central angle φ, the electronic control unit 230 can apply a current flowing in a first direction D1 to the stator 213 so that different polarities can be induced into one or more poles 211a of the rotor 211 and one or more slots 213a of the stator 213.

For example, in a situation where a relative angle θ is 10 degrees, and a central angle φ is 15 degrees, that is, the relative angle θ is less than the central angle φ, when one or more poles 211a of the rotor 211 is an N pole, the electronic control unit 230 can apply a current in the first direction D1 in which the current flows from the outside to the inside to one or more slots 213a of the stator 213 so that the one or more slots 213a of the stator 213 can have an S pole having a polarity different from the N pole. In this situation, an attractive force is generated between the pole 211a and the slot 213a, and in turn, can be transferred to the steering shaft 330, which is the rotation shaft, by acting as a counter force in a clockwise direction opposite to a counterclockwise direction that is the rotation direction of the rotor 211.

Figure 6:
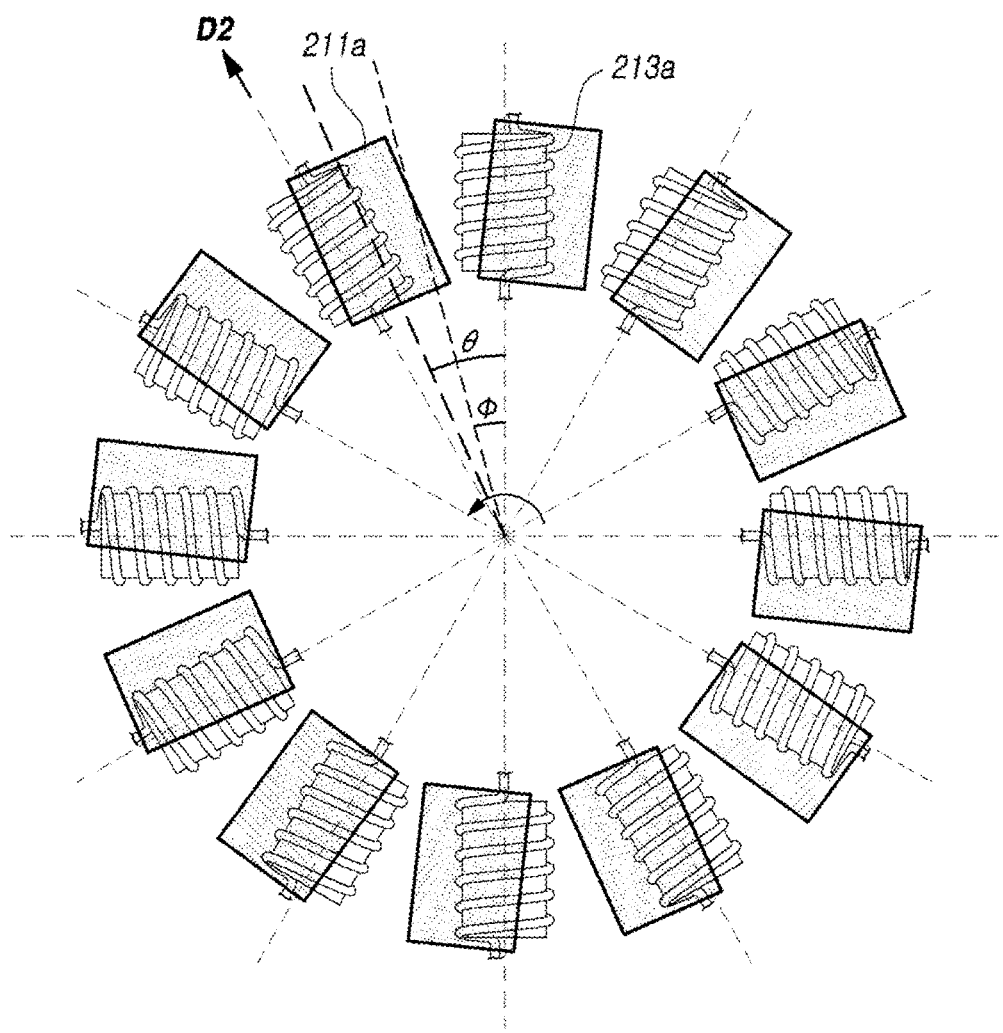

FIG. 6 is a diagram illustrating a situation in which the steering shaft 330 is rotated counterclockwise by 20 degrees.

When a relative angle θ is greater than a central angle φ, the electronic control unit 230 can apply a current flowing in a second direction D2 to the stator 213 so that an identical polarity can be induced into one or more poles 211a of the rotor 211 and one or more slots 213a of the stator 213.

In one embodiment, referring to FIG. 6, a relative angle θ may be 20 degrees as an angle between a pole 211a rotating in the counterclockwise direction from the 12 o'clock position toward the 11 o'clock position and a slot 213a that is adjacent to this pole 211a in a direction opposite to the rotation direction of the pole 211a and is in the 12 o'clock position with respect to the steering shaft 330, which is the rotation shaft, and a central angle ϕ may be 15 degrees obtained by dividing 30 degrees, which is an angle ρ between adjacent slots 213a determined according to 12 slots of the stator 213, by 2.

In the situation where the relative angle θ is 20 degrees, and the central angle ϕ is 15 degrees, that is, the relative angle θ is greater than the central angle ϕ, when one or more poles 211a of the rotor 211 is an N pole, the electronic control unit 230 can apply a current in the second direction D2 in which the current flows from the inside to the outside to one or more slots 213a of the stator 213 so that the one or more slots 213a of the stator 213 can have the same N pole. In this situation, a repulsive force is generated between the pole 211a and the slot 213a, and in turn, can be transferred to the steering shaft 330, which is the rotation shaft, by acting as a counter force in a clockwise direction opposite to a counterclockwise direction that is the rotation direction of the rotor 211.

Figure 7:
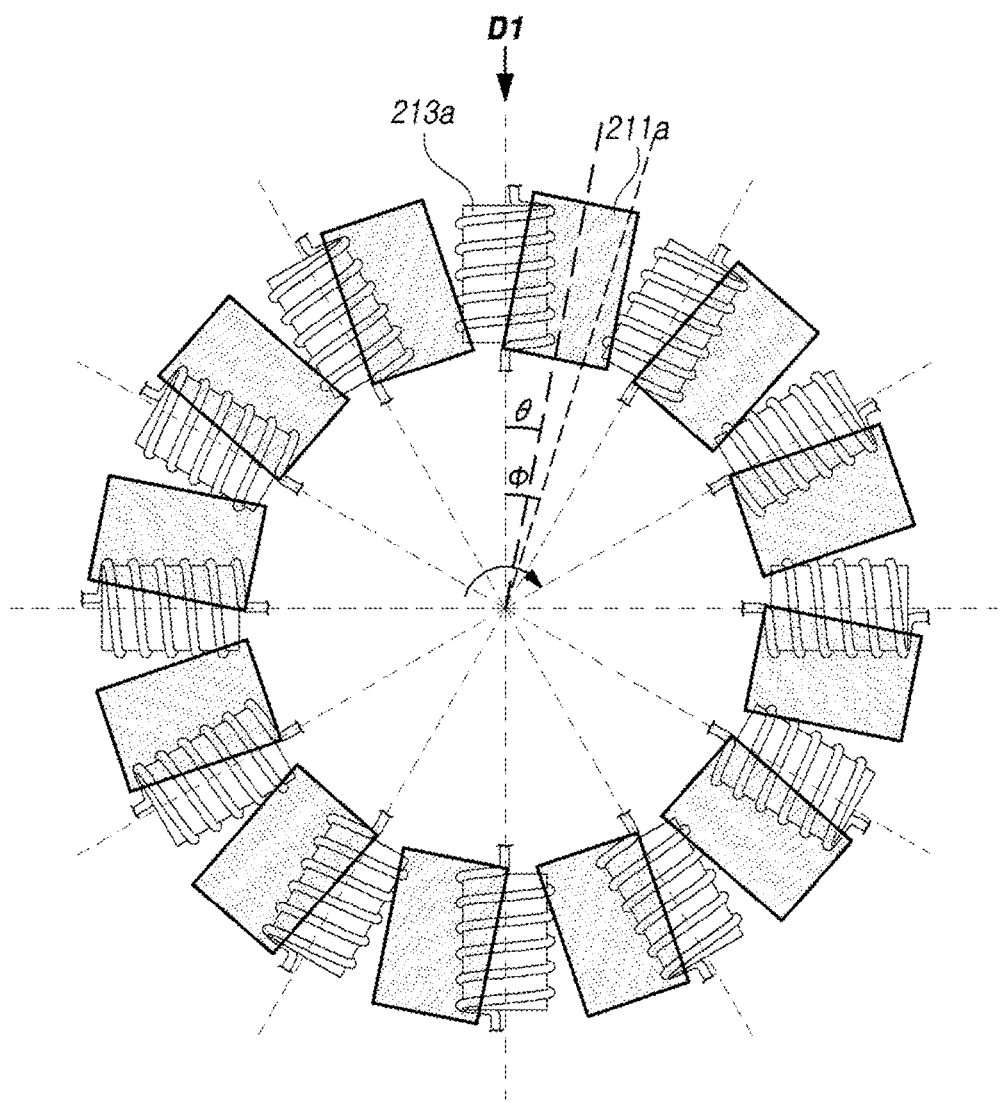

FIG. 7 is a diagram illustrating a situation in which the steering shaft 330 is rotated clockwise by 10 degrees.

Referring to FIG. 7, a relative angle θ may be 10 degrees as an angle between a pole 211a rotating in the clockwise direction from the 12 o'clock position toward the 1 o'clock position and a slot 213a that is adjacent to this pole 211a in a direction opposite to the rotation direction of the pole 211a and is in the 12 o'clock position with respect to the steering shaft 330, which is the rotation shaft, and a central angle ϕ may be 15 degrees obtained by dividing 30 degrees, which is an angle ρ between adjacent slots 213a, by 2.

In the situation where the relative angle θ is 10 degrees, and the central angle ϕ is 15 degrees, that is, the relative angle θ is less than the central angle ϕ, when one or more poles 211a of the rotor 211 is an N pole, the electronic control unit 230 can apply a current in the first direction D1 in which the current flows from the outside to the inside to one or more slots 213a of the stator 213 so that the one or more slots 213a of the stator 213 can have an S pole having a polarity different from the N pole. In this situation, an attractive force is generated between the pole 211a and the slot 213a, and in turn, can be transferred to the steering shaft 330, which is the rotation shaft, by acting as a counter force in a counterclockwise direction opposite to a clockwise direction that is the rotation direction of the rotor 211.

Figure 8:
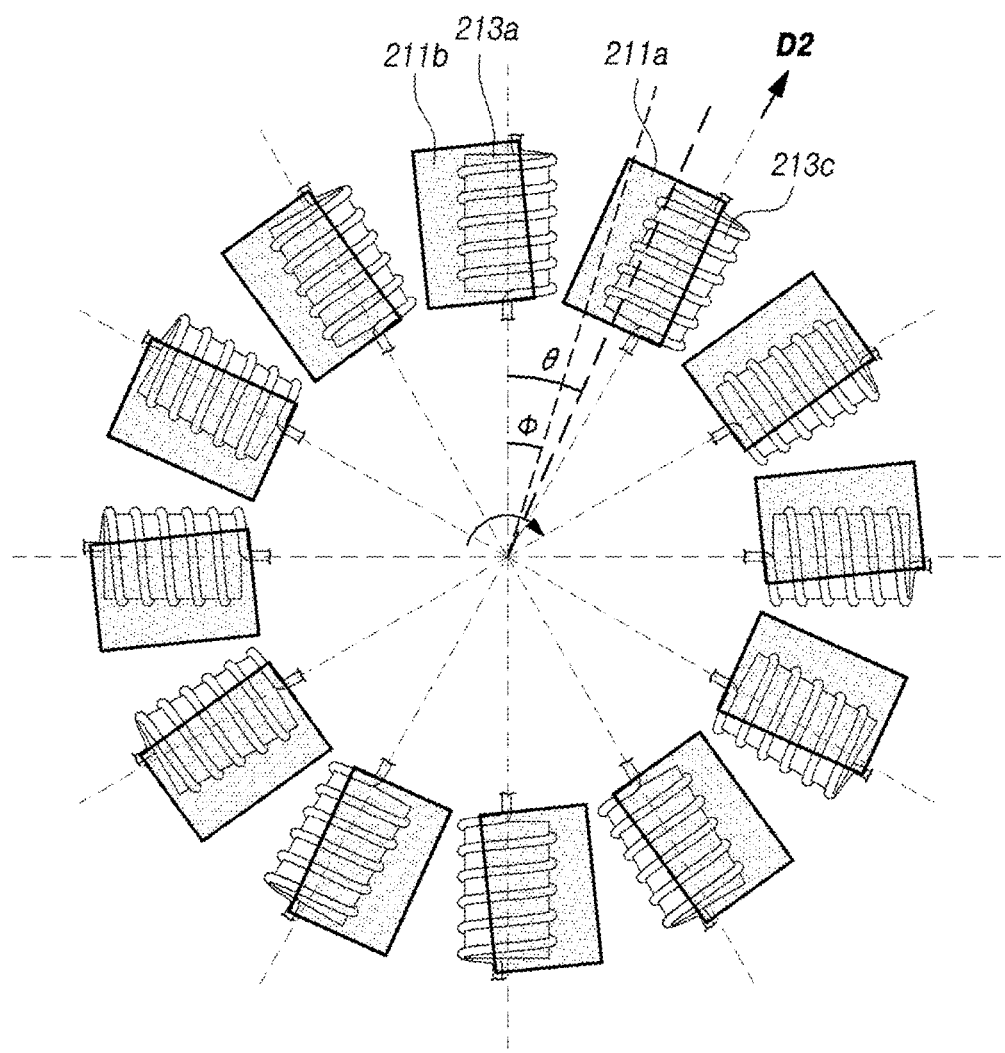

FIG. 8 is a diagram illustrating a situation in which the steering shaft 330 is rotated clockwise by 20 degrees.

Referring to FIG. 8, a relative angle θ may be 20 degrees as an angle between a pole 211a rotating in the clockwise direction from the 12 o'clock position toward the 1 o'clock position and a slot 213a that is adjacent to this pole 211a in a direction opposite to the rotation direction of the pole 211a and is in the 12 o'clock position with respect to the steering shaft 330, which is the rotation shaft, and a central angle ϕ may be 15 degrees obtained by dividing 30 degrees, which is an angle ρ between adjacent slots 213a, by 2.

In the situation where the relative angle θ is 20 degrees, and the central angle ϕ is 15 degrees, that is, the relative angle θ is greater than the central angle ϕ, when one or more poles 211a of the rotor 211 is an N pole, the electronic control unit 230 can apply a current in the second direction D2 in which the current flows from the inside to the outside to one or more slots 213a of the stator 213 so that the one or more slots 213a of the stator 213 can have the same N pole. In this situation, a repulsive force is generated between the pole 211a and the slot 213a, and in turn, can be transferred to the steering shaft 330, which is the rotation shaft, by acting as a counter force in a counterclockwise direction opposite to a clockwise direction that is the rotation direction of the rotor 211.

Meanwhile, the poles 211a of the rotor 211 may alternately have an N pole and an S pole. In this case, the electronic control unit 230 may simultaneously apply currents in different directions to the slots 213a of the stator 213. In one embodiment, a current flowing in the first direction D1 may be applied to a slot 213a in the 12 o'clock position, and a current flowing in the second direction D2 may be applied to a slot 213a in the 11 o'clock position, thus, leading an attractive force or a repulsive force to simultaneously generate between each pole 211a and each slot (213a).

In another embodiment, all of the X number of poles 211a of the rotor 211 may have an identical polarity.

Referring to FIGS. 5 to 8, in a situation where all of the poles 211a of the rotor 211 have an identical polarity, the electronic control unit 230 can compare a corresponding relative angle θ with a corresponding central angle ϕ, and apply an identical current in the first direction or in the second direction to all of the slots 213a of the stator 213, thus, leading an attractive force or a repulsive force to simultaneously generate between each pole 211a and each slot (213a).

For example, all of the poles 211a of the rotor 211 may be N poles. In a situation where a relative angle θ is less than a central angle ϕ, the electronic control unit 230 can apply a current in the first direction D1 in which the current flows from the outside to the inside to all of the slots 213a of the stator 213 so that the slots 213a of the stator 213 can have an S pole having a polarity different from the N pole. Further, in a situation where the relative angle θ is greater than the central angle ϕ, the electronic control unit 230 can apply a current in the second direction D2 in which the current flows from the inside to the outside to all of the slots 213a of the stator 213 so that the slots 213a of the stator 213 can have the same N pole. Therefore, the electronic control unit 230 can apply a current in the same direction to all of the slots 213a of the stator 213, and cause attractive or repulsive forces to simultaneously generate between each pole 211a and each slot 213a. Thus, according to the embodiments described herein, directions in which a current flows can be effectively controlled.

In the above discussions with reference to FIGS. 5 to 8, although the first direction D1 has been defined as a direction of a current flowing from the outside to the inside of the slot 213a of the stator 213, and the second direction D2 has been defined as a direction of the current flowing from the inside to the outside of the slot 213a of the stator 213; however, embodiments of the present disclosure are not limited thereto. For example, the first direction D1 and the second direction D2 may vary depending on a winding direction of a corresponding coil. For example, a direction of a current flowing from the outside to the inside of a slot 213a of the stator 213 may be a second direction D2, and in this case, a direction of the current flowing from the inside to the outside of the slot 213a of the stator 213 may be a first direction D1.

Figure 9:
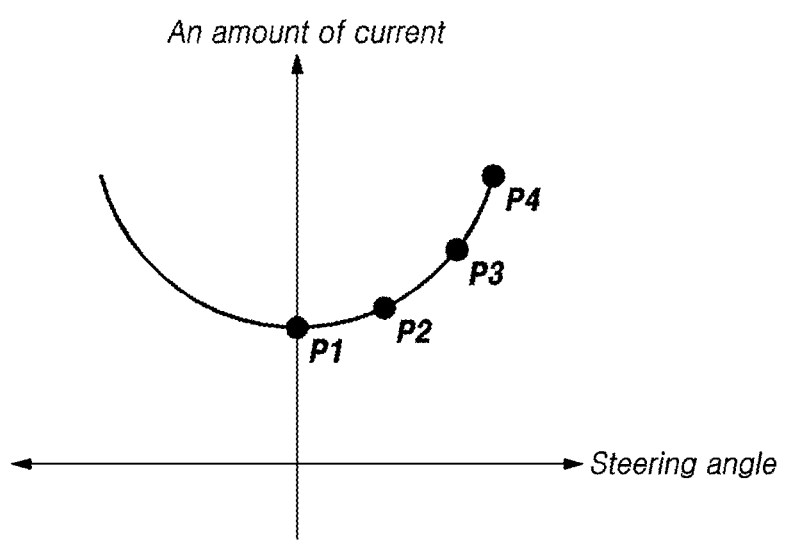
FIG. 9 is a graph representing the control of an amount of current in the steering apparatus according to aspects of the present disclosure.

FIG. 9 is a graph representing the control of an amount of current in the steering apparatus according to aspects of the present disclosure.

The electronic control unit 230 can dynamically control an amount of a current applied to the stator based on an absolute value of a steering angle of the steering wheel.

The absolute value of the steering angle may be a signal sensed by a steering angle sensor (not shown) coupled to a portion of the steering shaft 330, and based on this, the electronic control unit 230 can cause an amount of a current applied to the stator 213 to be increased or decreased.

The amount of current applied to the stator 213 may be dependent on, or proportional to, an absolute value of a steering angle of the steering wheel 320.

Referring to FIG. 9, the electronic control unit 230 can cause only 40% of the maximum amount of current that can be applied to the stator 213 to be applied to the stator 213 at point P1 where the absolute value of the steering angle is zero. In this situation, the amount of current applied to the stator 213 may be the amount of current required for allowing the steering shaft 330 to remain in the neutral state.

The electronic control unit 230 can control an amount of current applied to the stator 213 to be dependent on, or proportional to, a variance of an absolute value of the steering angle. For example, the electronic control unit 230 can control an amount of current applied to the stator 213 to be dependent on, or proportional to, a variation shown in the graph of FIG. 9 as an example variation of the absolute value of the steering angle. For example, the electronic control unit 230 can cause 50% of the maximum amount of current at point P2, 75% of the maximum amount of current at point P3, and 100% of the maximum amount of current at point P4 to be applied to the stator 213.

As the maximum amount of current is applied at the point P4, a, a maximum counter force between the rotor 211 and the stator 213 can be generated and then transferred to the steering shaft 330. Accordingly, in a situation where the rotation of the vehicle wheels reaches the maximum point, and an absolute value of a corresponding steering angle reaches the point P4, the rotation of the steering shaft 330 can be prevented by the maximum counter force.

The amounts of current at respective points described above are example values and may be set as absolute values, and a ratio of an amount of applied current to the maximum amount of current may be variously set. Through these operations, as the steering angle increases, the counter force applied to a user may increase.

Since the steering apparatus according to aspects of the present disclosure can generate a counter force and transfer the generated force to the steering shaft 330 without including a speed reducer, packaging with the steering shaft 330 can be easily performed, and the structure of the steering apparatus can be simplified.

Hereinafter, a steering method that can be performed by the steering apparatus described with reference to FIGS. 1 to 9 will be described. The steering method that will be described below may be performed by employing all, or one or more, of configurations or components included in the steering apparatus described above. Further, the steering method may be performed in any combination of two or more of the above-described embodiments.

Figure 10:
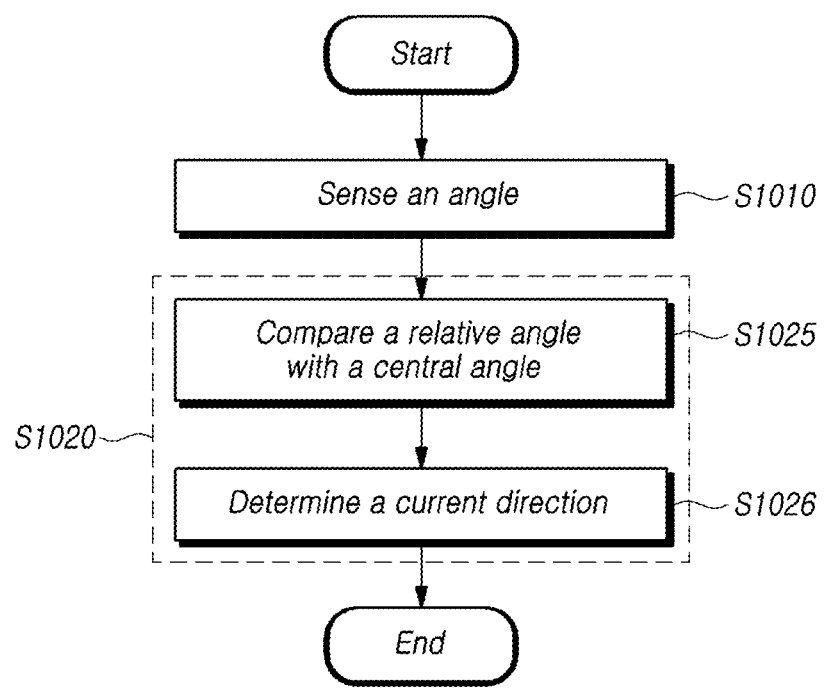
FIG. 10 is a flow diagram representing a steering method according to aspects of the present disclosure.

FIG. 10 is a flow diagram representing a steering method according to aspects of the present disclosure.

Referring to FIG. 10, the steering method includes an angle sensing step of detecting a relative angle between a rotor and a stator disposed to face the rotor that are included in a counter-force-generating motor capable of supplying a counter force to a steering wheel, and a current control step of dynamically controlling a direction of a current applied to the stator based on the relative angle.

The rotor and the stator of the counter-force-generating motor may be disposed to face each other with a dash panel interposed therebetween. The dash panel may include all, or one or more, devices and mechanisms for separating the engine room and the driver compartment. Further, the dash panel may contain a non-magnetic material.

The rotor of the counter-force-generating motor may be integrated with the steering shaft connected with the steering wheel, and thus, can rotate in sync with the turning of the steering shaft. In this case, a rotation angle of the rotor can be sensed by a sensor separately disposed in the rotor; however, embodiments of the present disclosure are not limited thereto. For example, a rotation angle of the rotor can be sensed by a steering angle sensor coupled to a portion of the steering shaft.

The rotor of the counter-force-generating motor may contain X number of poles, and the stator thereof may contain Y number of slots. The poles of the rotor may be magnetized to function as permanent magnets; however, embodiments of the present disclosure are not limited thereto. For example, the poles of the rotor may contain any polarizable material. A coil wound in a predetermined direction may be disposed in the slots of the stator.

A relative angle sensed by the angle sensor may be an angle between any one of the X number of poles of the rotor and any one of the Y number of slots of the stator with respect to a rotation shaft of the counter-force-generating motor 210.

The current control step S1020 may include a step S1025 of comparing the relative angle with a central angle determined based on the number of slots of the stator, and a step S1026 of determining a direction of a current applied to the stator.

In one embodiment, in current control step S1020, when the relative angle is less than the central angle, a current in a first direction may be applied to the stator so that different polarities can be induced in poles of the rotor and slots of the stator. In another embodiment, in current control step S1020, when the relative angle is greater than the central angle, a current in a second direction may be applied to the stator so that an identical polarity can be induced in poles of the rotor and slots of the stator.

All of the X number of poles contained in the rotor of the counter-force-generating motor may have an identical polarity. In one embodiment, the poles included in the rotor may be configured such that the permanent magnets are disposed perpendicular to the rotor and disposed in parallel with the steering shaft, which is the rotation shaft, so that all poles in a direction toward the stator may have an identical polarity; however, embodiments of the present disclosure are not limited thereto. In another embodiment, all of the poles included in the rotor may contain a material having an identical polarity.

Although not shown in FIG. 10, in the current control step, an amount of current applied to the stator can be dynamically controlled based on an absolute value of a steering angle of the steering wheel. In this case, the amount of current applied to the stator may be proportional to the absolute value of the steering angle of the steering wheel.

As a counter force can be generated and transferred to the steering shaft through the steering method according to embodiments described herein without including a speed reducer, it is possible to facilitate packaging with the steering shaft and simplify the structure of the steering apparatus.

The above description has been presented to enable any person skilled in the art to make and use the technical idea of the present disclosure, and has been provided in the context of a particular application and requirements thereof. Various modifications, additions and substitutions to the described embodiments will be readily apparent to those skilled in the art, and the general principles defined herein may be applied to other embodiments and applications without departing from the spirit and scope of the present disclosure. The above description and the accompanying drawings provide an example of the technical idea of the present disclosure for illustrative purposes only. That is, the disclosed embodiments are intended to illustrate the scope of the technical idea of the present disclosure. Thus, the scope of the present disclosure is not limited to the embodiments shown, but is to be accorded the widest scope consistent with the claims. The scope of protection of the present disclosure should be construed based on the following claims, and all technical ideas within the scope of equivalents thereof should be construed as being included within the scope of the present disclosure.

What is claimed is:

1. A steering apparatus comprising:
   a counter-force-generating motor that includes a rotor and a stator disposed to face the rotor, and is capable of supplying a counter force to a steering wheel;
   an angle sensor for sensing a relative angle between the rotor and the stator; and
   an electronic control unit capable of dynamically controlling a direction of a current applied to the stator based on the relative angle sensed by the angle sensor,
   wherein the rotor and the stator are disposed to face each other with a dash panel interposed therebetween.

2. The steering apparatus according to claim 1, wherein the dash panel includes a non-magnetic material.

3. The steering apparatus according to claim 1, wherein the rotor is integrated with a steering shaft connected with the steering wheel, and rotates in sync with turning of the steering shaft.

4. The steering apparatus according to claim 1, wherein the rotor includes X number of poles, and the stator includes Y number of slots,
   wherein the relative angle sensed by the angle sensor is an angle between one of the X number of poles of the rotor and one of the Y number of slots of the stator with respect to a rotation shaft of the counter-force-generating motor, and
   wherein the electronic control unit determines the direction of the current applied to the stator by comparing the relative angle with a central angle determined based on a number of slots of the stator.

5. The steering apparatus according to claim 4, wherein in a situation where the relative angle is less than the central angle, the electronic control unit applies a current flowing in a first direction to the stator so that different polarities are induced in the poles of the rotor and the slots of the stator.

6. The steering apparatus according to claim 4, wherein in a situation where the relative angle is greater than the central angle, the electronic control unit applies a current flowing in a second direction to the stator so that an identical polarity is induced in the poles of the rotor and the slots of the stator.

7. The steering apparatus according to claim 4, wherein all of the X number of poles included in the rotor have an identical polarity.

8. The steering apparatus according to claim 1, wherein the electronic control unit dynamically controls an amount of current applied to the stator based on an absolute value of a steering angle of the steering wheel.

9. The steering apparatus according to claim 8, wherein the amount of current applied to the stator is proportional to the absolute value of the steering angle of the steering wheel.

10. A steering method comprising:
    an angle sensing step of detecting a relative angle between a rotor and a stator disposed to face the rotor that are included in a counter-force-generating motor capable of supplying a counter force to a steering wheel, wherein the rotor and the stator are disposed to face each other with a dash panel interposed therebetween; and
    a current control step of dynamically controlling a direction of a current applied to the stator based on the relative angle.

11. The steering method according to claim 10, wherein the rotor includes X number of poles, and the stator includes Y number of slots,
    wherein the relative angle sensed by the angle sensor is an angle between one of the X number of poles of the rotor and one of the Y number of slots of the stator with respect to a rotation shaft of the counter-force-generating motor, and
    wherein in the current control step, the direction of the current applied to the stator is determined by comparing the relative angle with a central angle determined based on a number of slots of the stator.

12. The steering method according to claim 11, wherein in the current control step, in a situation where the relative angle is less than the central angle, a current flowing in a first direction is applied to the stator so that different polarities are induced in the poles of the rotor and the slots of the stator.

13. The steering method according to claim 11, wherein in the current control step, in a situation where the relative angle is greater than the central angle, a current flowing in a second direction is applied to the stator so that an identical polarity is induced in the poles of the rotor and the slots of the stator.

14. The steering method according to claim 10, wherein in the current control step, an amount of current applied to the stator is dynamically controlled based on an absolute value of a steering angle of the steering wheel.

* * * * *